United States Patent
Amlekar

(10) Patent No.: US 7,289,500 B1
(45) Date of Patent: Oct. 30, 2007

(54) METHOD AND SYSTEM FOR RELIABLE MULTICAST DATA TRANSMISSION

(75) Inventor: Shekhar Amlekar, Nagpur (IN)

(73) Assignee: Novell, Inc., Provo, UT (US)

( * ) Notice: Subject to any disclaimer, the term of this patent is extended or adjusted under 35 U.S.C. 154(b) by 1008 days.

(21) Appl. No.: 10/621,699

(22) Filed: Jul. 17, 2003

(51) Int. Cl.
*H04L 12/28* (2006.01)

(52) U.S. Cl. ...................... 370/390; 370/432

(58) Field of Classification Search ............... None
See application file for complete search history.

(56) References Cited

U.S. PATENT DOCUMENTS

| | | | | |
|---|---|---|---|---|
| 6,256,673 | B1 * | 7/2001 | Gayman .................... | 709/232 |
| 6,501,763 | B1 * | 12/2002 | Bhagavath et al. ......... | 370/432 |
| 6,515,994 | B1 * | 2/2003 | Chuah et al. ............. | 370/395.6 |
| 6,748,447 | B1 * | 6/2004 | Basani et al. ............... | 709/244 |
| 6,782,490 | B2 * | 8/2004 | Maxemchuk et al. ......... | 714/18 |
| 2002/0028687 | A1 * | 3/2002 | Sato et al. .................. | 455/466 |
| 2002/0038441 | A1 | 3/2002 | Eguchi et al. | |
| 2002/0065929 | A1 | 5/2002 | Kamentsky et al. | |
| 2002/0114283 | A1 * | 8/2002 | Lee .......................... | 370/252 |
| 2003/0161302 | A1 * | 8/2003 | Zimmermann et al. ..... | 370/363 |
| 2003/0206549 | A1 * | 11/2003 | Mody et al. ................ | 370/390 |
| 2004/0205071 | A1 * | 10/2004 | Uesugi et al. .............. | 707/100 |

OTHER PUBLICATIONS

Talarian Corporation, Talarian Products, Smart PGM Key Features, Apr. 25, 2003, 2 pages.
Talarian Corporation, Talarian Products, Smart PGM White Papers, Apr. 25, 2003, 4 pages.
Talarian Corporation, Talarian, Xcellenet and Talarian to Bring IP Multicast to Remote Systems Management, Apr. 25, 2003, 3 pages.
XCELLENET, EcelleNet's RemoteWare, Apr. 25, 2003, 2 pages.
XCELLENET, Data Sheet, MultiCast, 2 pages.
Skystream Networks, Z Band Content Delivery Platform, 2 pages.
Kencast, Inc., The Fazzt Digital Delivery System, 1 page.
ZVON, PGM Reliable Transport Protocol Specification, May 15, 2003, 2 pages.
ZVON, Introduction and Overview, May 15, 2003, 8 pages.
ZVON, Terms and Concepts, May 15, 2003, 8 pages.
ZVON, Procedures—Sources, May 15, 2003, 4 pages.

(Continued)

*Primary Examiner*—Andrew C. Lee
(74) *Attorney, Agent, or Firm*—Haynes and Boone, LLP

(57) ABSTRACT

Provided is a method and system for reliably multicasting a data transmission from a server to one or more clients, which may be connected via a control channel and a multicast data channel. In one example, the method includes sending a first data transmission to the clients over the multicast data channel. A response is received over the control channel from at least some of the clients. The response identifies data not received by the responding client. In some examples, the response may indicate that all the data was received. The server determines a minimum retransmission data set based on the responses. The minimum retransmission data set includes at least some of the data not received by the client during the first data transmission. The minimum retransmission data set is sent over the multicast data channel and received by the clients that did not receive it during the first data transmission.

25 Claims, 5 Drawing Sheets

OTHER PUBLICATIONS

ZVON, Procedures—Receivers, May 15, 2003, 7 pages.
ZVON, Procedures—Network, May 15, 2003, 5 pages.
ZVON, Packet Formats, May 15, 2003, 10 pages.
ZVON, Fragmentation Option—OPT_FRAGMENT, May 15, 2003, 1 page.
ZVON, Appendix A—Forward Error Correction, May 15, 2003, 17 pages.

* cited by examiner

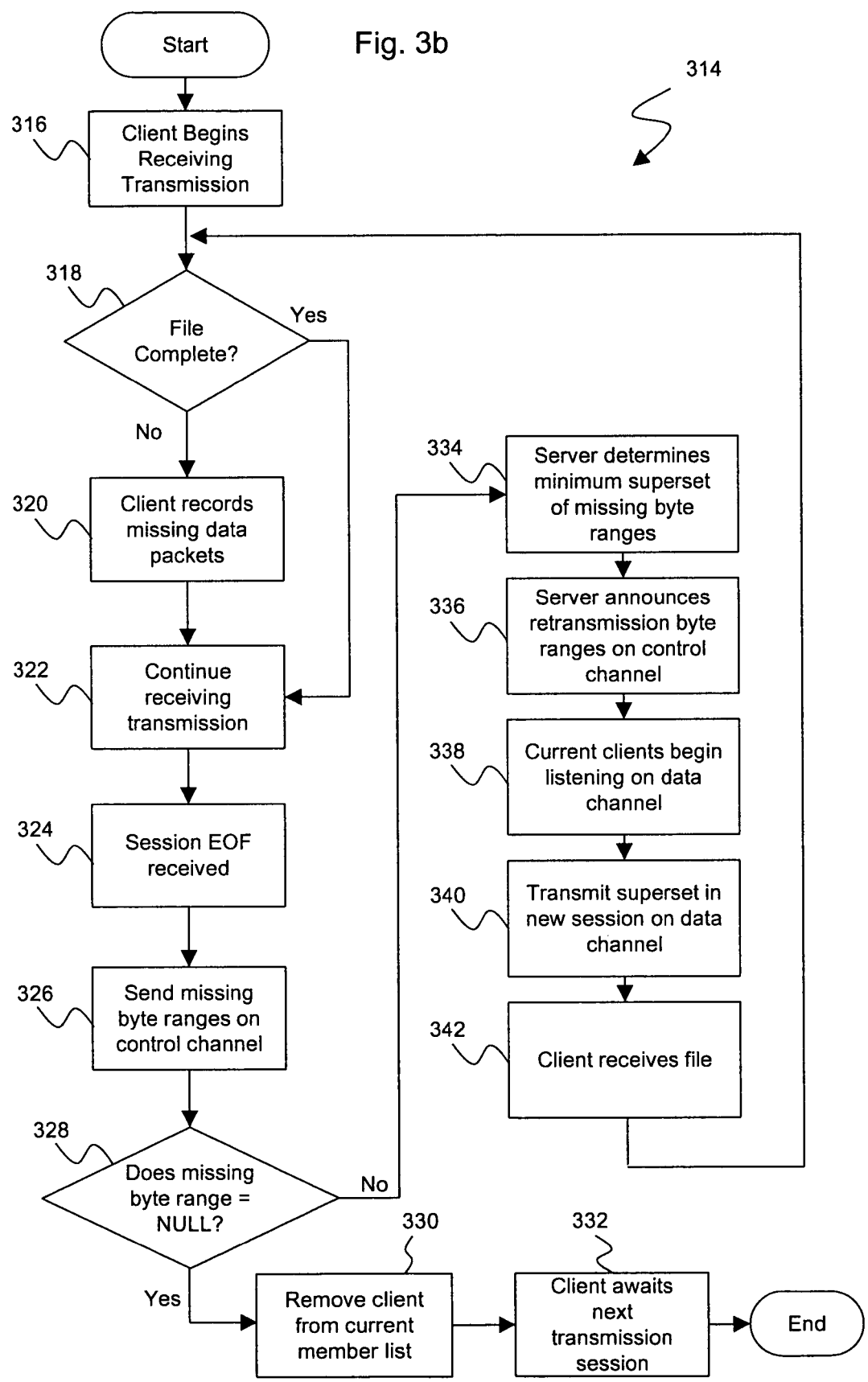

METHOD AND SYSTEM FOR RELIABLE MULTICAST DATA TRANSMISSION

BACKGROUND

This disclosure relates generally to multicast data transmission and, more specifically, to a method and a system for ensuring complete transmission of multicast files with minimum retransmissions.

A computer network generally has at least one computer (a server) that provides services to other computers (clients) via the network. Traditionally, network communications have employed a unicast transmission model in which a separate connection is made between a server and each of its clients. This model works particularly well when each client has unique demands of the server. However, when each client is receiving the same data, multiple copies of the same information packet can flood the network, causing congestion and escalating bandwidth requirements.

Multicasting may alleviate some of the problems associated with unicasting by enabling a server to transmit a single packet of information that may be received by multiple clients who have requested the information. Multicast enabled switches and routers permit the single packet of information to be copied so that only a single packet need be forwarded through each branch of the network to reach the clients requesting the information. Although multicasting may be used in a wide variety of applications in which large amounts of information are being sent to multiple clients, multicasting generally used for applications in which many clients want the identical data simultaneously. Such applications may include live audio or video transmissions, multi-user games, and real-time stock tickers.

Despite the benefits of multicasting for some applications, present implementations of multicasting do not enable a server to receive performance information back from clients, and therefore, transmission reliability may be sacrificed. Current methods of multicasting may also result in unrecoverable data loss.

Therefore, what is needed is an improved method and a system for the complete transmission of multicast files. It is also desirable to maintain efficiency by minimizing retransmissions.

SUMMARY

Provided is a method and system for reliably multicasting a data transmission from a server to one or more clients. The server and clients may be connected via a control channel and a multicast data channel. In one embodiment, the method comprises sending a first data transmission to the clients over the multicast data channel and receiving a response over the control channel from at least one of the clients identifying data not received by the client during the first data transmission. A minimum retransmission data set is determined based on the response, wherein the minimum retransmission data set includes at least a portion of the data not received by the client during the first data transmission. The minimum retransmission data set is sent over the multicast data channel.

BRIEF DESCRIPTION OF THE DRAWINGS

FIG. 3*b* is a flowchart illustrating a file reception process of FIG. 3*a*.

DETAILED DESCRIPTION

Figure 1:
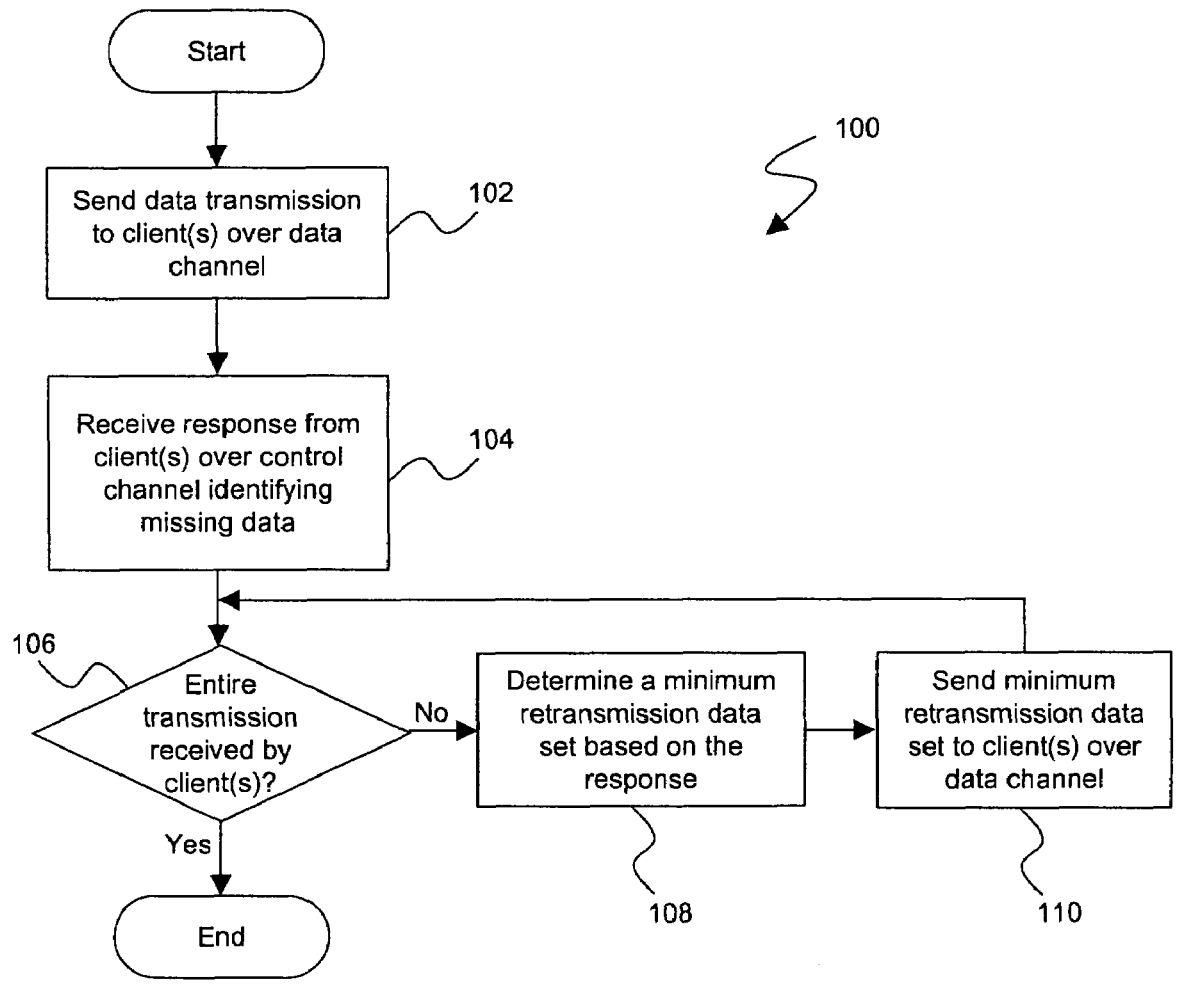
FIG. 1 is a flowchart illustrating one embodiment of a method for data multicasting in the network of FIG. 1.

This disclosure relates generally to multicast data transmission and, more specifically, to a method and a system for ensuring complete transmission of multicast files with minimum retransmissions. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a method 100 enables a computer (e.g., a server) to efficiently provide identical information to a plurality of other computers (e.g., clients). As will be described in greater detail in FIG. 2, the server may be connected to the clients via a control channel and a data channel. In step 102, the server transmits one or more files over the data channel using a multicast transmission. In step 104, the server receives a response from the clients over the control channel. If a file is not received in its entirety by one or more clients, the response may identify which parts of the file were not received by each client. If a client received the entire file, it may either not respond to the server or may indicate that the entire file was received, depending on the particular implementation of the method 100. For example, if a client chooses not to acknowledge the successful reception of the file, the lack of acknowledgement may be interpreted as an acknowledgement by the server after a predefined amount of time has expired with no further communication from the client.

In step 106, a determination is made (based on step 104) as to whether each file was received by each client in its entirety. If each file was received, the method 100 ends. However, if each file was not received, the method 100 continues to step 108, where the server determines a minimum retransmission data set based on the response of step 104. In the present example, the minimum retransmission data set includes each part of the file that was not received by the clients. In step 110, the server then sends the minimum retransmission data set to the clients. The minimum retransmission data set may be sent to all the clients or only to the clients who indicated that they were missing data. The method 100 then returns to step 106. Steps 106-110 may be repeated until all clients have received the data transmitted in step 102.

Figure 2:
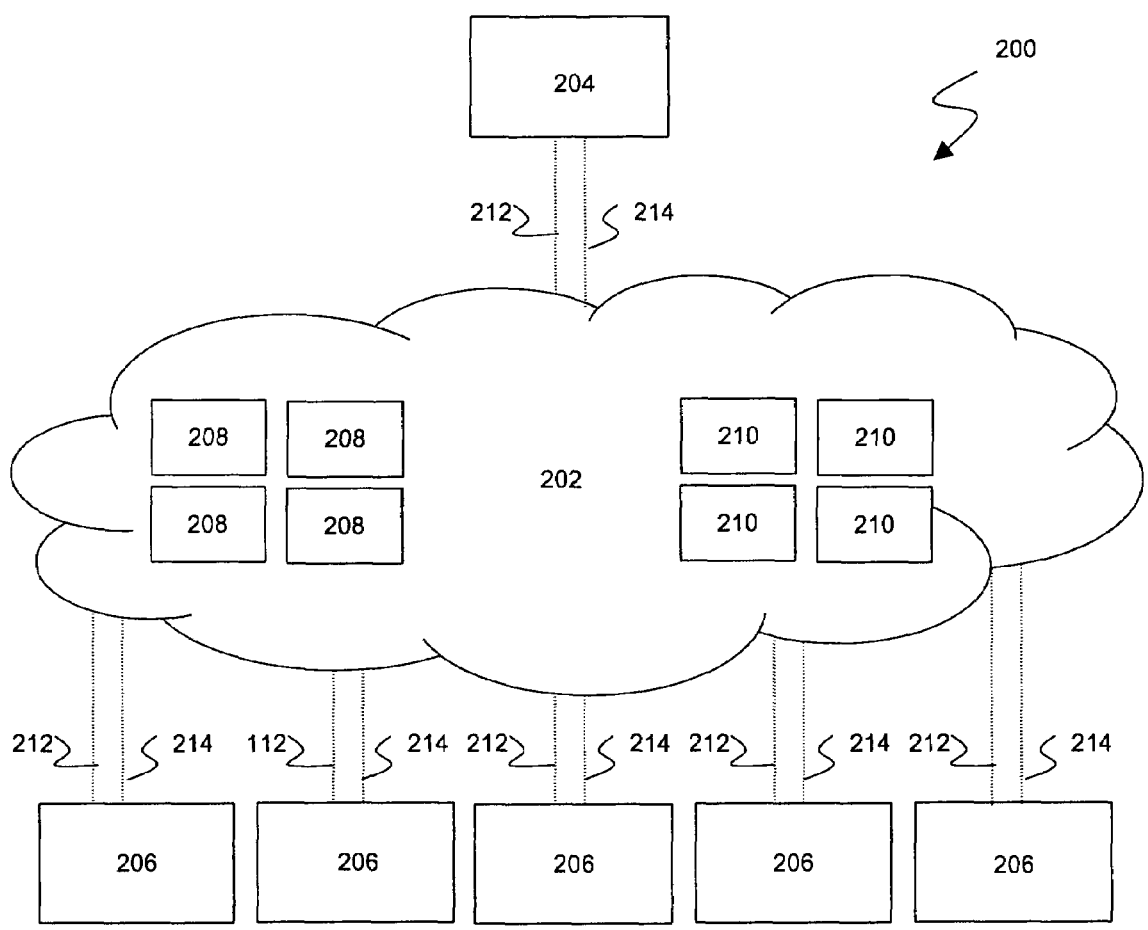
FIG. 2 is a diagram of an exemplary computer and network environment in which the methods of FIGS. 2, 3*a*, and 3*b* may be executed.

Referring now to FIG. 2, an exemplary communications system 200, within which the method 100 of FIG. 1 may be executed, is illustrated. The communication system 200 includes a computer network 202. Connected to the computer network 202 are a server 204 and one or more client computers 206 ("clients"). Additional servers, which may include host and proxy servers, may be connected to the computer network 202 to expand the services provided by the communications system 200. The computer network 202 may be, for example, the public Internet or a private intranet, and may include a plurality of routers 208, switches 210, and/or other equipment for connecting the server 204 to the clients 206. Further, the computer network 202 may include, for example, a satellite network, a terrestrial network, or a combination of the two. The routers 208 and switches 210 may be multicast enabled. It is understood that, in some embodiments, the client computers 206 may act as a server to other client computers 206.

The server 204 and the clients 206 may be connected to the network by a control channel 212 and a data channel 214. As one example, the communications system 200 may utilize a satellite link as the data channel 214 and may use a terrestrial connection as the control channel 212. The control channel, which may use a protocol such as a transmission control protocol (TCP), may be used to send metadata that provides descriptive information about a file or application being transmitted. Examples of such descriptive information may include attribute information such as name, size, and data type, as well as structural information such as length of fields, location of data, and how the data is associated with other data. The control channel 212 may remain open across multiple file transfer sessions to avoid the need for repeated connection establishment and termination.

The data channel 214 may utilize one or more of a variety of multicast protocols for multicast data delivery. To conserve network resources, the data channel 214 may remain open only during the transmission of data and may be closed after a transmission has ended. The multicast protocol selected may be, for example, a pragmatic general multicast (PGM) protocol as specified in the Internet Engineering Task Force (IETF) Request for Comment (RFC) 3208 entitled, "PGM Reliable Transport Protocol Specification." The PGM protocol may enable a receiver of a multicast session to detect unrecoverable data loss. Unlike unicast protocols such as TCP, which utilize positive acknowledgments (ACKs) to guarantee reliable data delivery, PGM uses a negative acknowledgment (NAK) and negative acknowledgment confirmation (NCF) system to alert the server when data is not delivered. Unicast protocol ACKs may add excessive traffic to a network, especially for sessions transmitted from one server to many clients. By comparison, PGM does not contribute heavily to network congestion because NAKs are only generated when data is not received, and NCFs limit redundant NAKs. However, PGM does not prevent a client from experiencing unrecoverable data loss, nor does PGM provide a mechanism for minimizing the retransmission of lost data.

Figure 3A:
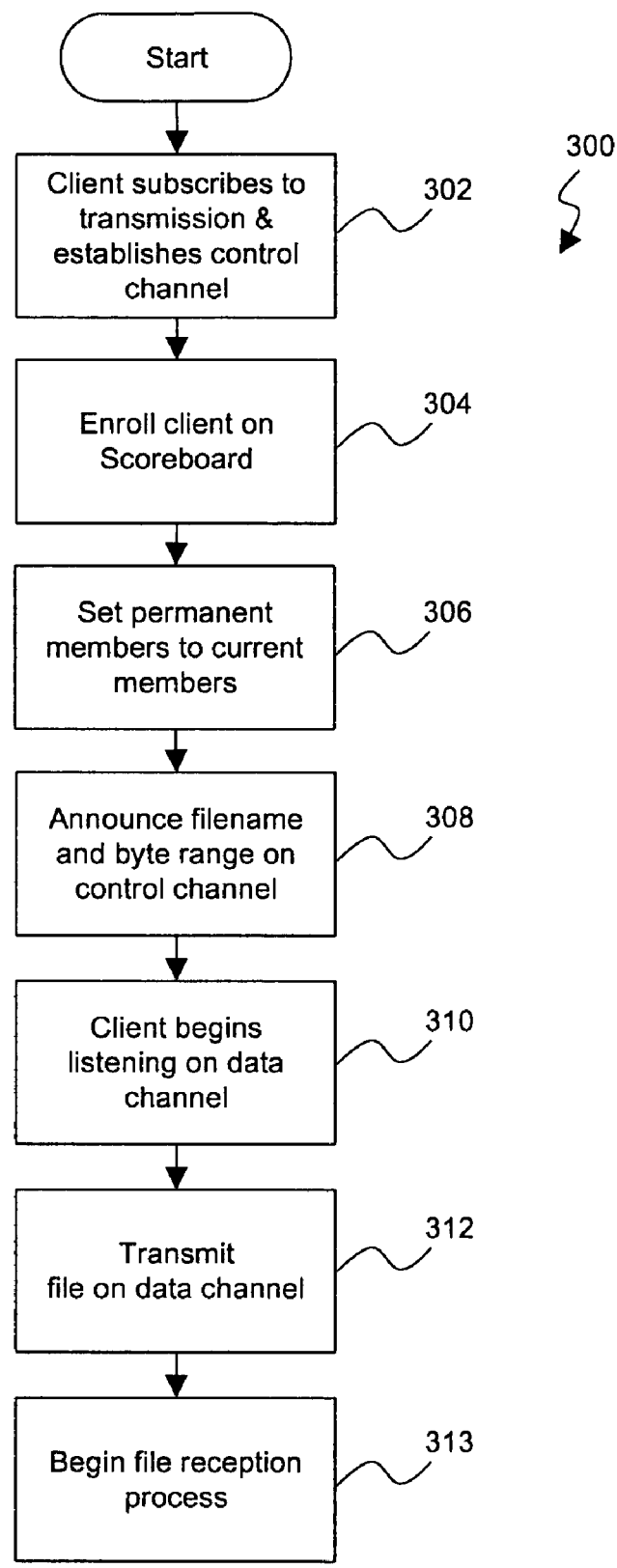
FIG. 3*a* is a flowchart illustrating another embodiment of a method for data multicasting in the network of FIG. 1.

Referring now to FIG. 3a, in another embodiment, a method 300 enables reliable data multicasting from a server to one or more clients with minimum retransmissions. The method begins, at step 302, when a client (e.g., the client 206 of FIG. 2) communicates an interest in receiving a transmission from a server (e.g., the server 204 of FIG. 2), thereby establishing a control channel (e.g., the control channel 212 of FIG. 2) between the client and the server. A transmission may include multiple files, and the files may include multiple data packets. At step 304, the client 206 is enrolled into a scoreboard (FIG. 4) used by the server 204 for file transmission.

Figure 4:
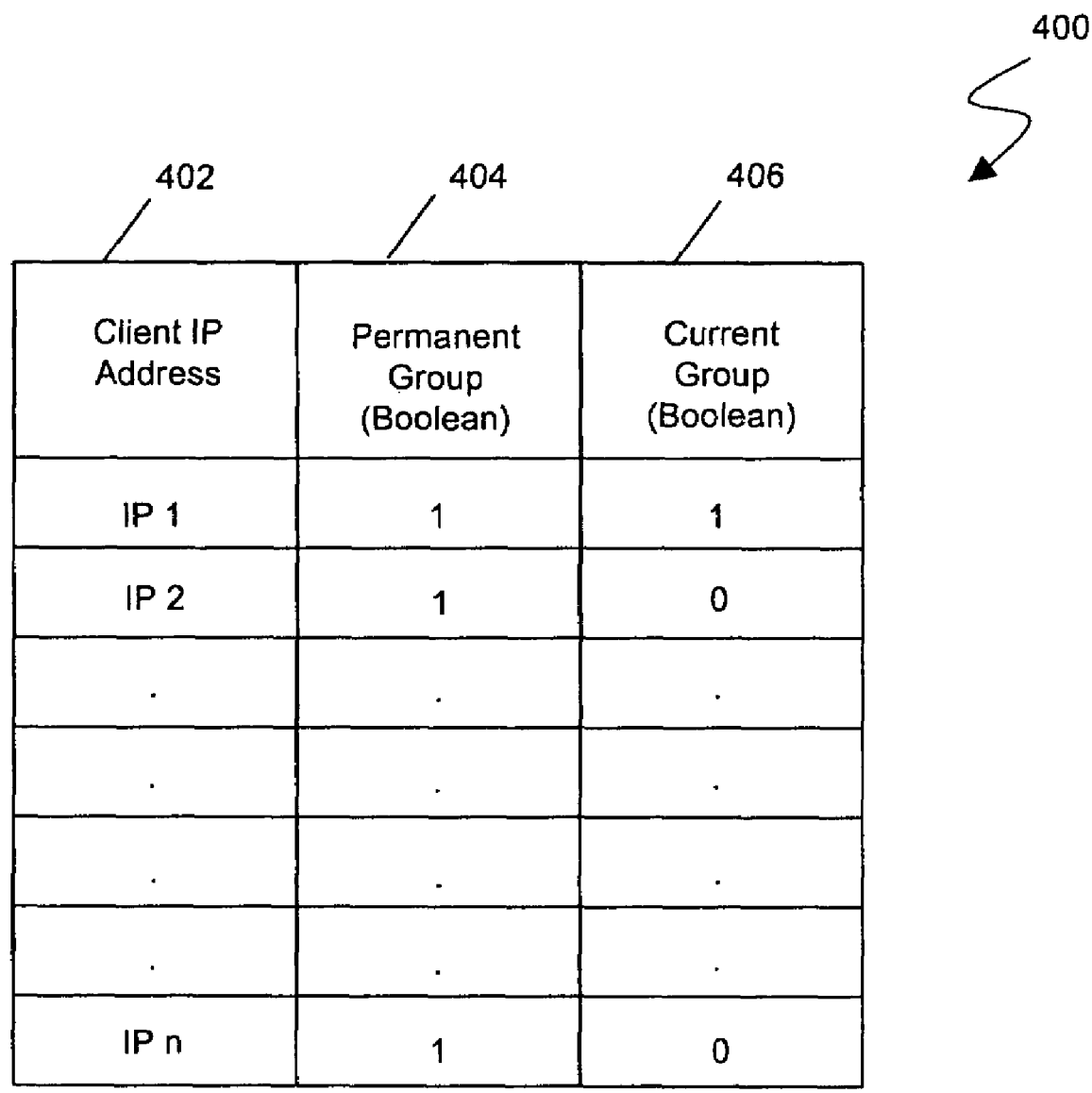
FIG. 4 is a scorecard that may be used with the method of FIGS. 3*a* and 3*b*.

With additional reference to FIG. 4, a scoreboard 400 includes an identity 402 of each client 206. The identity may be, for example, an internet protocol (IP) address or other identifier associated with the client 206, such as a media access control (MAC) number. Upon enrollment, the client 206 may become a member of a permanent transmission group 404 which includes clients who have expressed an interest in receiving the file transmissions by establishing a control channel connection. In the present example, the Boolean character "1" indicates membership in the group, and the character "0" indicates that a particular client's IP address is not a member of the group. Initially, the client 206 may also become a member of a current transmission group 406. Membership in the current transmission group 406 may be indicated using the Boolean scheme described above. The current transmission group 406 may include clients 206 toward whom the server's current session is directed. The server 204 may periodically scan the control channel 212 for each client 206 to confirm client connectivity.

Referring again to FIG. 3a, at step 306, all members of the permanent transmission group 404 (FIG. 4) are made members of the current transmission group 406 (FIG. 4). The server 204 may confirm that all members of the current transmission group 406 are connected using the scoreboard 400 or another method. At step 308, the server 204 may announce the upcoming transmission over the control channel 212 to all permanent transmission group members. The announcement may include the number of files to be transferred, a filename or filenames, the number of byte ranges to be transmitted for each filename, and the starting and ending bytes for each of the byte ranges to be transmitted in the session. Proceeding to step 310, the clients 206 comprising the current transmission group 406 may begin listening on a data channel (e.g., the data channel 214 of FIG. 2). At step 312, the server 204 begins the transmission of the file over the data channel 214, and at step 313 the process of reliable file reception begins.

Referring now to FIG. 3b, a method 314 for reliable file reception begins at step 316 with the clients 206, which are members of the current transmission group 406, receiving the transmission over the data channel 214. Proceeding to step 318, if the file is received in its entirety by each client 206, the client proceeds to step 322 and continues to receive the additional files in the transmission. Because the client 206 has received the announcement as described in step 308, the client may be aware of the expected bytes to be delivered. The client 206 may compare the expected byte ranges to the received byte ranges to determine whether the file was received in its entirety. If the file is incomplete, the client 206 records the bytes corresponding to the missing data packets at step 320 and continues receiving the transmission at step 322. If, for example, PGM is the protocol utilized for the data channel, missing data packets that cannot be restored cause the client 206 to detect an unrecoverable data loss. PGM allows the client 206 to record information about the missing data packets using an option of the protocol, OPT_FRAGMENT. This option allows the client 206 to know the amount of missing data and the byte off-set where that data packet belongs in the file, while continuing to receive transmissions.

At step 324, the client 206 may detect the end of the transmission by receiving an end-of-file (EOF) indicator from the server 204. The client 206 then closes the session on the data channel 214, and at step 326, communicates to the server 204 over the control channel 212 the missing byte ranges not received in the data transmission of step 312. The communication may include the client's IP address, the number of files to be transferred, the file name or names, the number of missing byte ranges for each filename, and the starting and ending byes for the missing byte ranges. The communication from the client 206 to the server 204 over the control channel 212 may also include any ACKs or NAKs required by the multicast protocol. If, at step 328, the client 206 has received the transmission in its entirety, the missing byte range may be indicated as NULL, which may serve as an acknowledgement to the server 204 that the transmission was received. If the missing byte range is NULL, the client 206 may be removed from the current transmission group 406 at step 330, but at step 332 may continue listening on the control channel 212 for announcement of the next transmission session. If, at step 328, the missing byte range is something other than NULL, the retransmission process begins.

At step 334, the server 204 aggregates the missing byte ranges received from all clients 206, and determines the minimum superset of the missing byte ranges for retransmission. At step 336, the server 204 announces this minimum superset for retransmission over the control channel 212. Responsive to the announcement over the control channel 212, a client 206 listening on the control channel and interested in the retransmission may select whether to reestablish a data channel 214 connection at step 338. The current transmission group 406 of the scorecard 400 is updated to include the clients 206 which have reestablished the data channel 214 for the retransmission. Because only the interested clients 206 connect for the retransmission based upon the announcement over the control channel 212, data may not be carried to clients 206 that are not interested in the data. The server 204 may then, at step 340, begin transmitting at least a portion of the original transmission, which may be the minimum superset of the missing byte ranges, to the members of the current transmission group 406 over the established data channel 214. At step 342, the clients 206 receiving the retransmission select from the retransmission only the bytes which were not received in the prior transmission. The steps 318 to 342 may be repeated until no clients exist in the current transmission group 406.

The methods 300 and 314 may be used for the multicast transmission of a variety of data. The transmission can, for example, include music files, financial data, movie videos, support packs, security bug fixes in a network management system, web content, or other content of interest to multiple clients or desired by multiple clients simultaneously.

The methods described in FIGS. 3a and 3b may also be used to accommodate a client who joins the permanent transmission group 404 after a transmission has begun. The client may be made a member of the current transmission group 406 and may receive an announcement for the session over the control channel. This announcement may include a filename, the number of byte ranges, and the starting and ending bytes for each of the byte ranges to be transmitted in the session. When the client connects to the server on a data channel and begins receiving the transmission of the session, the client may know and record the missing bytes based upon the control channel announcement. The client may then recover the missing bytes as described in FIG. 3b.

If a client disconnects during a transmission, the client may be removed from both the permanent transmission group and current transmission group. If a client disconnects while not a member of a current transmission group, the client may still be removed from the permanent transmission group.

The methods 300 and 314 may also be used for multicasting in selected tiers of a tiered electronic distribution (TED) application which allows one server to distribute data files, server applications, or other types of data to multiple subscribing servers. Still another application for the methods 300 and 314 is reliable content delivery within a content distribution network (CDN). CDNs provide a method of alleviating network congestion by caching and serving web site content from servers near the client rather than from the server of origin. The methods 300 and 314 may also be used to transmit multicast data from a central office to a branch office using a branch office management appliance.

The methods 300 and 314 may also incorporate forward error correction (FEC) software which may reduce the number of retransmissions by alleviating some portion of the data packet loss. FEC software may be used with the original transmission and/or may be used with subsequent retransmissions.

While the preceding description shows and describes one or more embodiments, it will be understood by those skilled in the art that various changes in form and detail may be made therein without departing from the spirit and scope of the present disclosure. For example, the type of protocols used in the preceding description may vary, and it is understood that substitutions may be made. Similarly, different network configurations may be used for different types of digital devices. Therefore, the claims should be interpreted in a broad manner, consistent with the present disclosure.

What is claimed is:

1. A method for reliably multicasting data from a server to one or more clients, wherein the server and clients are connected via a control channel and a multicast data channel, the method comprising:
   sending a first data transmission to the clients over the multicast data channel;
   receiving a response over the control channel from at least one of the clients identifying data not received by the client during the first data transmission;
   determining a minimum retransmission data set based on the response, wherein the minimum retransmission data set includes at least a portion of the data not received by the client during the first data transmission; and
   sending the minimum retransmission data set over the multicast data channel.

2. The method of claim 1 further comprising aggregating the identified data from the at least one client to determine the minimum retransmission data set.

3. The method of claim 1 further comprising announcing a first announcement over the control channel, wherein the first announcement includes descriptive information about the first data transmission.

4. The method of claim 3 wherein the descriptive information includes a file name and one or more byte ranges to be transmitted in the first data transmission.

5. The method of claim 4 wherein determining the minimum retransmission data set further includes comparing the one or more byte ranges of the first announcement with the identified data not received by the client during the first data transmission.

6. The method of claim 3 further comprising announcing a second announcement over the control channel, wherein the second announcement includes descriptive information about the minimum retransmission data set.

7. The method of claim 6 further comprising:
   connecting the one or more clients to the server on the control channel;
   connecting the one or more clients to the multicast data channel for receiving the first data transmission; and
   responsive to the second announcement, selectively connecting a subset of the one or more clients to the multicast data channel for receiving the minimum retransmission data set.

8. The method of claim 6 wherein the control channel is connected between the first and second announcements, and wherein the multicast data channel is disconnected after sending the first data transmission.

9. The method of claim 1 further comprising:
disconnecting the multicast data channel after the first data transmission; and
selectively re-connecting the multicast data channel in response to an election by the one or more clients to receive the minimum retransmission data set.

10. The method of claim 1 wherein the first data transmission includes a music file.

11. The method of claim 1 wherein each response includes an internet protocol (IP) address of the one or more clients and a set of byte ranges corresponding to the identified data not received.

12. The method of claim 1 wherein the one or more clients are each connected to the server via the control channel for exchanging meta-data describing the first data transmission and minimum retransmission data set.

13. The method of claim 1 wherein the multicast data channel utilizes a multicast transport protocol.

14. The method of claim 13 further comprising using the multicast transport protocol to detect and record information about unrecoverable data loss.

15. A method for multicasting data from a server to one or more clients over a network, the method comprising,
announcing from the server a first announcement over a control channel;
receiving from the server a first data transmission over a multicast data channel;
sending a notification over the control channel from each of the one or more clients to the server identifying at least a portion of the data not received by the client during the first data transmission; and
receiving a second data transmission over the multicast data channel from the server, wherein the second data transmission includes a minimum retransmission of data from the first data session determined by the notifications from the one or more clients.

16. The method of claim 15 further comprising aggregating the notification from each of the one or more clients to determine the minimum retransmission for the second data transmission.

17. The method of claim 15 wherein the first announcement includes a file name and one or more byte ranges to be transmitted in the first data transmission, and
wherein identifying at least a portion of the data not received by the client includes comparing the one or more byte ranges included in the first announcement with the received first data transmission.

18. The method of claim 17 further comprising maintaining a scorecard having a permanent transmission group and a current transmission group.

19. The method of claim 18 wherein the maintaining a scorecard includes:
enrolling the one or more clients connected to the server via the control channel in the permanent transmission group,
enrolling the at least one of the clients identifying data not received during the first data transmission in the current transmission group, and
removing the at least one of the clients from the current transmission group after the one or more byte ranges are received.

20. The method of claim 15 further comprising selecting from the received second data transmission, by each of the one or more clients, at least the identified portion of the data not received by the client during the first data transmission.

21. A system for reliably multicasting data over a network, the system comprising,
a server accessible to one or more client computers;
a control channel connecting the server and client computers;
a multicast data channel connecting the server and client computers; and
a plurality of instructions for execution by at least one of the server and client computers, the instructions including:
an instruction for transferring a first data transmission by the server to the one or more client computers via the control channel;
an instruction for transferring a notification from each of the one or more client computers to the server identifying information about missing data from the first data transmission via the control channel;
an instruction for transferring the first data transmission from the server to the one or more client computers via the multicast data channel; and
an instruction for transferring a second data transmission from the server to the one or more client computers via the multicast data channel, wherein the second data transmission includes a minimum superset of the missing data identified by each of the one or more client computers.

22. The system of claim 21 further comprising one or more multicast enabled routers adapted for operating the multicast data channel between the server and the one or more client computers.

23. The system of claim 21 further comprising one or more multicast enabled switches adapted for operating the multicast data channel between the server and the one or more client computers.

24. The system of claim 21 further comprising:
an instruction for maintaining the control channel between the sending of the first data transmission and the sending of the second data transmission; and
an instruction for closing the data channel between the first data transmission and the second data transmission.

25. The system of claim 21 further comprising an instruction for using the control channel to exchange meta-data between the server and the one or more client computers.

* * * * *